United States Patent [19]

Nam et al.

[11] Patent Number: 5,012,108
[45] Date of Patent: Apr. 30, 1991

[54] DETECTION OF NUCLEAR RADIATION

[76] Inventors: Tom L. Nam, 114 Sixth Avenue, Bez Valley, Johannesburg, Transvaal; Rex J. Keddy, Bevan Road, Rivonia, Transvaal; Jacques P. Sellschop, 60 Greenhills Road, Greenside, Johannesburg, Transvaal, all of South Africa

[21] Appl. No.: 370,195

[22] Filed: Jun. 22, 1989

[30] Foreign Application Priority Data

Jul. 6, 1988 [ZA] South Africa ................. 88/4841

[51] Int. Cl.$^5$ .............................................. G01T 1/11
[52] U.S. Cl. ................................... 250/484.1; 250/337
[58] Field of Search ................. 250/484.1 A, 483.1, 250/337

[56] References Cited

U.S. PATENT DOCUMENTS 4,465,932  8/1984  Burgemeister ............. 250/370.07
4,754,140  6/1988  Nam et al. .................. 250/337

FOREIGN PATENT DOCUMENTS 0342528  7/1972  U.S.S.R. ................. 250/484.1 A

OTHER PUBLICATIONS

Hanig, R., "Enhancement of Lyolumenescence by Radiation Sensitization and Chemical Dopants", Int. J. Appl. Radiat. Isot. vol. 35, No. 10, pp. 987-989, 1984.

Primary Examiner—Jack I. Berman
Assistant Examiner—Richard Hanig
Attorney, Agent, or Firm—Scully, Scott, Murphy & Presser

[57] ABSTRACT

A method of detecting, counting or otherwise measuring nuclear radiation includes the steps of exposing a diamond containing single substitutional paramagnetic nitrogen to the nuclear radiation to cause electrons or holes to be trapped at lattice imperfections within the diamond crystal structure, heating the diamond to cause it to luminesce and utilizing the luminescence as a means for the detection, counting or measurement of the nuclear radiation. The method is characterized by subjecting the diamond to a high dose of neutron or electron irradiation prior to exposing it to the nuclear radiation to be detected. This, it has been found, improves both the sensitivity of the diamond as a thermoluminescent material and linearity of the thermoluminescent response to nuclear radiation dose.

10 Claims, 1 Drawing Sheet

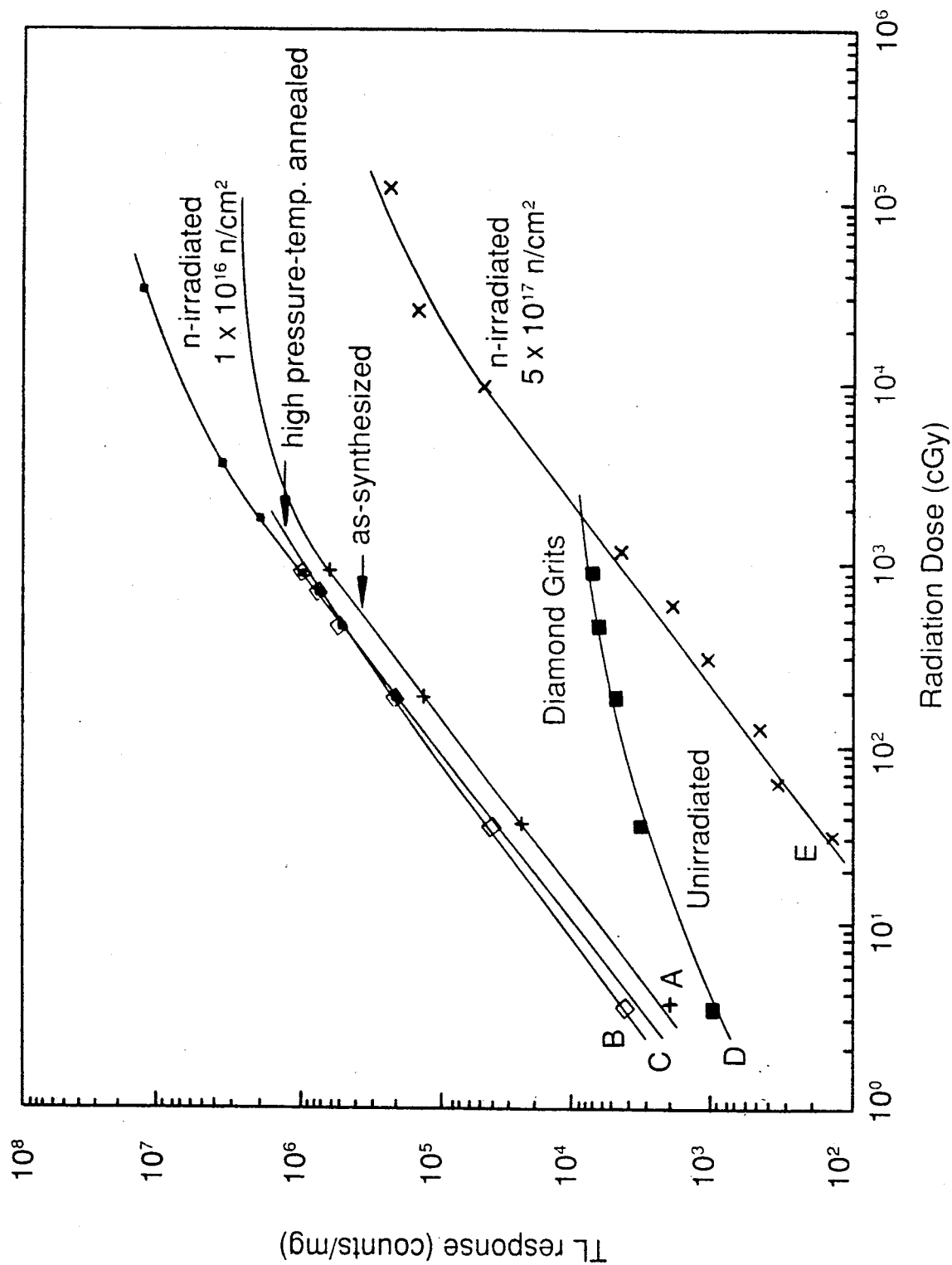

DETECTION OF NUCLEAR RADIATION

BACKGROUND OF THE INVENTION

This invention relates to the detection of nuclear radiation.

When a thermoluminescent phosphor is exposed to nuclear radiation while at a sufficiently low temperature, many of the free electrons or holes become trapped at lattice imperfections. They remain trapped for long periods of time when stored at that or a lower temperature. As the temperature is raised, the probability of escape is increased and the electrons (or holes) are released from the traps, subsequently returning to stable energy states, often with the emission of light. Materials which exhibit this characteristic are known as thermoluminescent dosimetry (TLD) materials, and an example of such a material is lithium fluoride.

Certain types of diamond, for example Type I industrial diamonds, are known to exhibit a certain degree of thermoluminescence.

U.S. Pat. No. 4,754,140 describes and claims diamond, particularly synthetic diamond, which has a nitrogen content not exceeding 100 ppm as a thermoluminescent material capable of detecting nuclear radiation. The diamond also preferably contains boron in an amount of 0.1 to 10 ppm.

SUMMARY OF THE INVENTION

According to the present invention, a method of detecting, counting or otherwise measuring nuclear radiation includes the steps of irradiating a diamond containing single substitutional paramagnetic nitrogen with a high dose of neutrons or electrons, exposing the irradiated diamond to the nuclear radiation to cause electrons or holes to be trapped at lattice imperfections within the diamond crystal structure, heating the diamond to cause it to luminesce and utilising the luminescence as a means for the detection, counting or measurement of the nuclear radiation.

DESCRIPTION OF THE DRAWING

The drawing illustrates graphically the thermoluminescent (TL) response in relation to gamma ray dose for various diamonds.

DETAILED DESCRIPTION OF THE INVENTION

Nuclear radiation is ionising radiation that has its genesis within the nucleus of the atom. Examples of such radiation are radiation by X-rays, alpha particles, neutrons, protons, electrons and gamma rays. Subjecting the nitrogen-containing diamond to this radiation causes electrons or holes to be trapped at lattice imperfections within the diamond crystal structure. Heating the diamond then causes at least some of the electrons or holes to be released from their traps, returned to their stable energy states at centres known as luminescence centres and emit light or luminescence. The temperature to which the diamond is subjected to cause it to luminesce will be above ambient and below 500° C. The preferred temperature to which the diamond is subjected is 200° to 500° C., more preferably 250° to 400° C.

The luminescence may be used to detect, count or otherwise measure the nuclear radiation. The method has particular application to the measurement of nuclear radiation doses. The luminescence of the diamond may be used to calculate the dose of radiation to which the diamond was subjected. In practise, the temperature of the diamond will be raised to approximately 200° C. to anneal out background luminescence. Thereafter, the particle is heated linearly up to a temperature of about 400° C. and the luminescence data gathered and integrated. This integrated value is directly proportional to the dose of radiation to which the diamond was subjected. Thus, by providing a suitable calibrated standard it is possible readily to determine the radiation dose in a given circumstance by measuring the luminescent value over a temperature range and integrating those values and comparing the value thus obtained against the calibrated standard.

To this extent, the method of the present invention is essentially the same a that described in U.S. Pat. No. 4,754,140. The invention differs from that of this United States patent in that prior to exposing the diamond to the nuclear radiation to be detected, counted or otherwise measured, the diamond is irradiated with a high dose of neutrons or electrons. This, it has been found, increases the concentration of luminescence centres improving both the sensitivity of the diamond as a luminescent material and the linearity of the thermoluminescent response to nuclear radiation dose. These improvements manifest themselves particularly with high doses of nuclear radiation being detected, i.e. doses of 10 Gy or higher. The dose of the neutron or electron irradiation will typically be in the range $10^{12}$ to $10^{18}$ particles. $cm^{-2}$. Preferably the dose will be in the range $10^{16}$ to $10^{17}$ particles. $cm^{-2}$.

The diamond which is subjected to the irradiation will contain some nitrogen in the form of single substitutional paramagnetic nitrogen. The nitrogen content of this form will generally be less than 150 ppm. The diamond may also contain some boron. Typically, the boron when present, will be in the range 0.1 to 10 ppm, preferably less than 5 ppm.

As mentioned above, it has surprisingly been found that the pre-irradiation of the nitrogen-containing diamond improves both the sensitivity of the diamond as a thermoluminescent material and the linearity of the thermoluminescent (TL) response to nuclear radiation dose. These properties are illustrated graphically by the attached drawing. Referring to this drawing line A reflects the change of TL response to gamma radiation dose of an as-synthesised diamond particle containing less than 150 ppm single substitutional paramagnetic nitrogen and boron in an amount of less than 10 ppm. Line B is for the same diamond which has been subjected to a high temperature/high pressure annealing, while line C is for the same diamond which has been subjected to neutron irradiation of dose $1 \times 10^{16}$ $n.cm^{-2}$. Thermoluminescence of each of the irradiated diamonds was achieved by heating the irradiated diamonds to a temperature of about 400° C. The n-irradiated diamond shows several advantages over the high pressure/high temperature annealed diamond and the as-synthesised diamond. First, it has a linearity over a wider range of doses of the gamma radiation than the as-synthesised diamond. Second, at higher radiation doses, i.e. doses of 100 Gy and higher, useful measurements can still be obtained which is not so with either the high pressure/high temperature annealed diamond or the as-synthesised diamond.

Similar observations have been made with diamond grit which contained approximately 100 ppm of single substitutional paramagnetic nitrogen and no measurable quantity of boron. The TL response to gamma radiation dose of the unirradiated diamond grit follows line D where the linearity is rather poor. The neutron irradiated diamond grit follows the line E. The diamond grit in this case was subjected to neutron irradiation of dose $5 \times 10^{17}$ n.cm$^{-2}$. For both the unirradiated diamond grit and the neutron irradiated diamond grit, luminescence was achieved by heating the diamond grit, after exposure to gamma radiation, to a temperature of about 400° C. It will be noted that the linearity of line E is far better than that of line D and at higher gamma doses, i.e. doses of 10 Gy and higher, useful measurements can be obtained with the n-irradiated grit, but not with the unirradiated grit.

We claim:

1. A method of detecting, counting or otherwise measuring radiation includes the steps of irradiating a diamond containing single substitutional paramagnetic nitrogen with a high dose of neutrons or electrons, exposing the irradiated diamond to the nuclear radiation to cause electrons or holes to be trapped at lattice imperfections within the diamond crystal structure, heating the diamond to cause it to luminesce and utilising the luminescence as a means for the detection, counting or measurement of the nuclear radiation.

2. A method according to claim 1 wherein the dose of the neutrons or electrons is in the range $10^{12}$ to $10^{18}$ particles.cm$^{-2}$.

3. A method according to claim 1 wherein the dose of the neutrons or electrons is in the range $10^{16}$ to $10^{17}$ particles.cm$^{-2}$.

4. A method according to claim 1 wherein the diamond is caused to luminesce by heating it to a temperature which is above ambient and below 500° C.

5. A method according to claim 1 wherein the diamond is caused to luminesce by heating it to a temperature in the range 200° to 500° C.

6. A method according to claim 1 wherein the diamond is caused to luminesce by heating it to a temperature in the range 250° to 400° C.

7. A method according to claim 1 wherein the nuclear radiation to be detected, counted or otherwise measured, is selected from X-rays, alpha particles, protons, neutrons, electrons and gamma rays.

8. A method according to claim 1 wherein the single substitutional paramagnetic nitrogen is present in an amount of less than 150 ppm.

9. A method according to claim 1 wherein the diamond also contains boron in the range 0.1 to 10 ppm.

10. A method according to claim 9 wherein the boron is present in an amount of less than 5 ppm.

* * * * *